United States Patent
Skofteland et al.

(10) Patent No.: US 8,221,095 B2
(45) Date of Patent: Jul. 17, 2012

(54) METHOD AND APPARATUS FOR PROTECTION OF COMPRESSOR MODULES AGAINST INFLUX OF CONTAMINATED GAS

(75) Inventors: Håkon Skofteland, Jar (NO); Kjell Olav Stinessen, Oslo (NO)

(73) Assignee: Aker Subsea AS, Fornebu (NO)

( * ) Notice: Subject to any disclaimer, the term of this patent is extended or adjusted under 35 U.S.C. 154(b) by 630 days.

(21) Appl. No.: 12/307,077

(22) PCT Filed: Jun. 20, 2007

(86) PCT No.: PCT/NO2007/000222
§ 371 (c)(1),
(2), (4) Date: May 20, 2009

(87) PCT Pub. No.: WO2008/002148
PCT Pub. Date: Jan. 3, 2008

(65) Prior Publication Data
US 2009/0317265 A1 Dec. 24, 2009

(30) Foreign Application Priority Data
Jun. 30, 2006 (NO) .................................. 20063044

(51) Int. Cl.
*F04B 39/02* (2006.01)
(52) U.S. Cl. ........................................ 417/366; 417/371
(58) Field of Classification Search .................. 417/366, 417/371, 421, 423.9
See application file for complete search history.

(56) References Cited

U.S. PATENT DOCUMENTS
3,919,854 A 11/1975 Denis
(Continued)

FOREIGN PATENT DOCUMENTS
| EP | 1 008 759 | 6/2000 |
| EP | 1 008 759 A1 | 6/2000 |
| EP | 1 069 313 | 1/2001 |

(Continued)

OTHER PUBLICATIONS
International Search Report date Oct. 29, 2007, from corresponding PCT application.

*Primary Examiner* — Anne Hines
(74) *Attorney, Agent, or Firm* — Young & Thompson

(57) ABSTRACT

A method for protection of compressor modules against undesirable influx of contaminated gas, comprising a pressure housing (3) which by means of one of more sealing elements (4) is generally divided into a first compartment (8) equipped with a compressor (2) and a second compartment (7) equipped with a gas-filled motor (1), the compressor and the motor being drivably connected to each other by at least one shaft (9), is distinguished by protecting the second compartment (7) with motor (1) against direct influx of contaminated gas from the first compartment (8) with compressor (2) by means of compressed gas that is supplied from a withdrawal point (13) at the first or intermediate stage of the compressor, or from the compressor outlet (16), and by introducing the compressed gas directly into the seal (4) or in between two or more seals so as to flow through the at least one seal (4) back to the first compartment (8). The invention also relates to an apparatus for use in connection with the method.

20 Claims, 2 Drawing Sheets

U.S. PATENT DOCUMENTS

Figure 1:
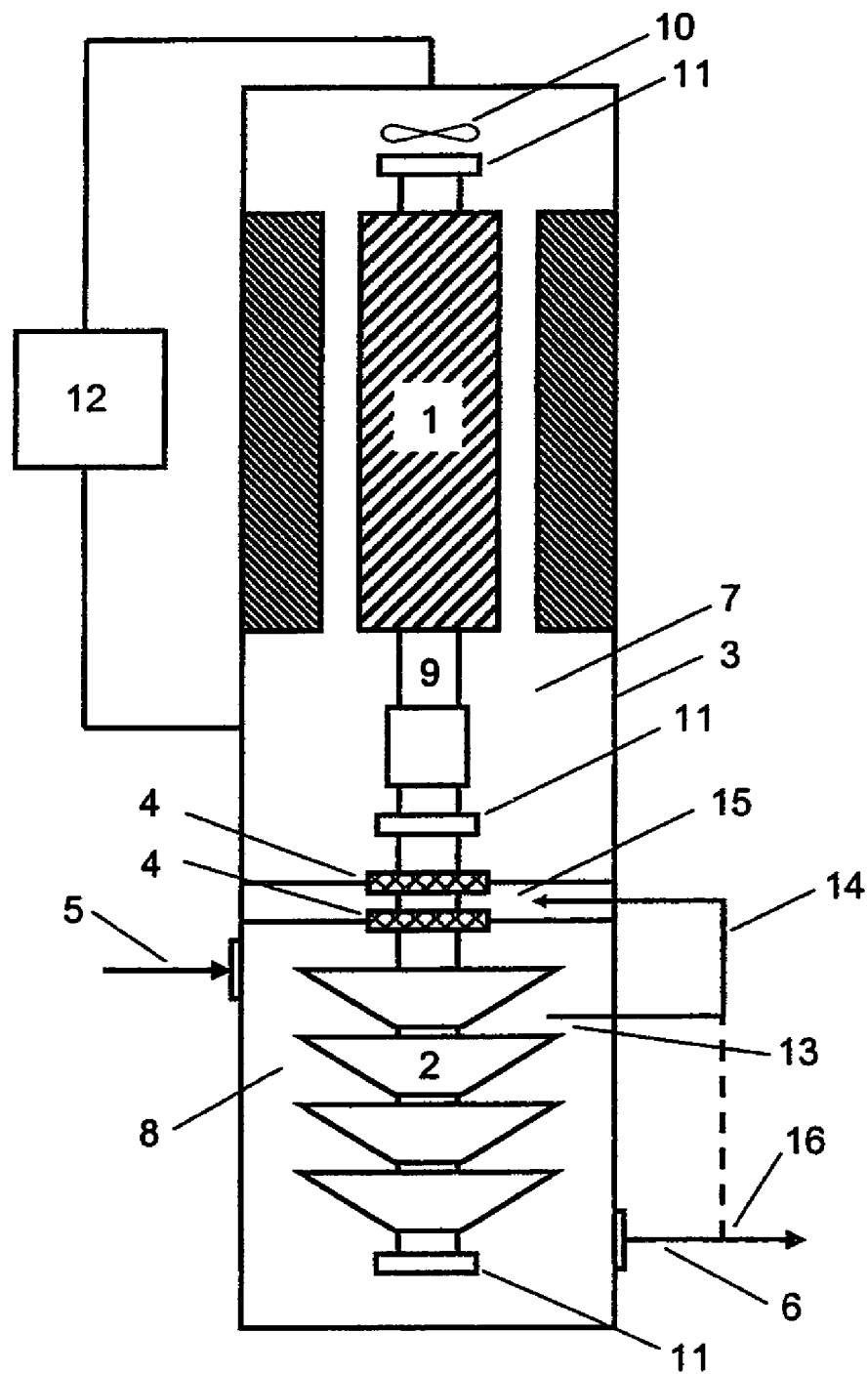

| | | |
|---|---|---|
| 6,390,789 B1 * | 5/2002 | Grob et al. .................... 417/350 |
| 6,464,469 B1 | 10/2002 | Grob et al. |
| 6,607,348 B2 | 8/2003 | Jean |
| 2002/0031437 A1 | 3/2002 | Jean |
| 2004/0258729 A1 | 12/2004 | Czernuszka et al. |
| 2005/0142004 A1 | 6/2005 | Appleford et al. |
| 2006/0157251 A1 | 7/2006 | Stinessen et al. |

FOREIGN PATENT DOCUMENTS

| | | |
|---|---|---|
| EP | 1 069 313 B1 | 9/2005 |
| EP | 1 467 104 B1 | 6/2006 |
| WO | 03/071139 | 8/2003 |
| WO | WO 03/071139 | 8/2003 |
| WO | 2005/003512 | 1/2005 |

* cited by examiner

METHOD AND APPARATUS FOR PROTECTION OF COMPRESSOR MODULES AGAINST INFLUX OF CONTAMINATED GAS

The present invention relates to electric, gas-filled motors which are used in compressor modules under or above water for compressing hydrocarbon gases in a wellstream, and more particularly to a compressor module which comprises a pressure housing equipped with a compressor and a motor. However, the invention is as well suited for other types of rotating equipment that is used below or above the sea surface, onshore or on platforms.

Known subsea compressor modules employ standard oil-lubricated bearings or the like. The present invention has enabled the exploration of the possibilities of using magnetic bearings in such compressor modules under water, as this will have several advantages, particularly during operation. Magnetic bearings are more reliable and make the compressor module less expensive to operate. Of particular importance is the fact that magnetic bearings eliminate the use of lubricating oil and thus potential problems that may occur through: dilution of the lubricating oil by hydrocarbon gases with which the oil is in contact, accumulation of hydrocarbon condensates or water in the lubricating oil or degradation of the lubricating oil over time due to its specific use in subsea compressor modules. Problems encountered when utilising non-canned magnetic bearings in a compressor module under water are in many respects similar to those associated with the use of electromotors, as both need a clean dry atmosphere in order to function properly over time. Encapsulated or canned magnetic bearings also exist or are in the process of being developed. It is claimed that these bearings are capable of operating in the untreated wellstream of hydrocarbon gas. However, it is believed that it is advantageous also for these types of magnetic bearings that they should be installed and operated in a dry, clean atmosphere so as to improve their functionality and reliability in long-term use.

Onshore it is known to use compressor modules with compressor, motor and magnetic bearings installed in a pressure housing. In this case, the motor and magnetic bearings are cooled using a closed system, where compressed gas from the pressure side or intermediate stage of the compressor is supplied directly to the motor and flushed through the motor in sufficient quantity to permit necessary cooling to be obtained. The motor and the magnetic bearings are thus exposed continuously to the medium that is compressed in the compressor. This solution is not suitable for subsea compressors where hydrocarbon gas or other media that may contain condensate, water or other particles and contaminants are compressed. Such a continuous supply and flushing with gas containing contaminants through the motor and the non-canned magnetic bearings may over time result in problems of corrosion, stresses and a build-up of deposits. Access to the subsea compressors is difficult when they are at great ocean depths and far offshore, hence they must be capable of being operated for a long time without any need for intervention and maintenance. To obtain high reliability, the gas-filled motor must be protected from the medium that is compressed by the compressor, and a continuous supply of contaminated gas must be avoided when cooling the motor and magnetic bearings.

It is possible to install a filter, a separator or the like in the gas supply line to the motor in order to allow condensate, water and particles or other contaminants to be removed. This calls for extra equipment which results in lower reliability and a need for maintenance. Experience with treatment systems of this type in underwater applications is wanting today, and consequently there is a need for a more reliable solution where subsea compressors are concerned. Alternatively, clean gas can be supplied in pipes from the shore for the protection and cooling of the motor, but this has been found to be extremely expensive because subsea compressors are often far from shore and a long way from the nearest platform. Solutions of this type are described in NO Patent Applications 20033034 and 20054179, and also in International Application WO 2005/003512.

With today's technology, the previously described solutions for protecting gas-filled motors in subsea compressor modules are not suitable. There is therefore a need to ensure that the gas-filled motor and the magnetic bearings have optimum protection against condensate, water and particles or other contamination that is carried along with the compressed medium from the compressor.

The present invention provides, in a first aspect, a method for protection of compressor modules against undesirable influx of contaminated gas, comprising a pressure housing which by means of one or more sealing elements is generally separated into a first compartment equipped with a compressor and a second compartment equipped with a gas-filled motor, the compressor and the motor being drivably connected to each other by at least one shaft, characterised in protecting the second compartment with motor against direct influx of contaminated gas from the first compartment with compressor by means of compressed gas that is supplied from a withdrawal point at the first or intermediate stage of the compressor, or from the outlet of the compressor, and introducing the compressed gas directly into the seal or in between two or more seals so as to flow through the at least one seal back to the first compartment with compressor.

Furthermore, in its second aspect, an apparatus is provided for protection of compressor modules against undesirable influx of contaminated gas, comprising a pressure housing which by means of one or more sealing elements is generally separated into a first compartment equipped with a compressor and a second compartment equipped with a gas-filled motor, the compressor and the motor being drivably connected to each other by at least one shaft, characterised in that the second compartment with motor is protected against direct influx of contaminated gas from the first compartment with compressor by means of compressed gas that is supplied from a withdrawal point at the first or intermediate stage of the compressor, or from the outlet of the compressor, and that the compressed gas is introduced directly into the seal or in between two or more seals so as to flow through the at least one seal back to the first compartment with compressor.

Further advantageous embodiments of the invention are set forth in the dependent claims.

The invention entails that no gas is supplied from the production stream directly into the gas-filled motor. It further involves the use of a closed cooling circuit for cooling the actual motor, in which the gas in the gas-filled motor circulates through the motor housing via the magnetic bearings to a motor cooler that is placed outside the pressure housing of the compressor module. The motor cooler utilises cooling with surrounding seawater to remove the heat that is generated as a result of the losses and the friction in the motor and magnetic bearings. Forced circulation of the gas in the cooling circuit can be obtained by using a fan or the like connected to the motor shaft, and the cooling circuit for the motor recirculates the cooling gas as long as there is no exchange across the seals that separate the second compartment with motor from the first compartment with compressor. A closed cooling circuit results a huge reduction in the amount of particles and contaminants to which the motor is exposed because the only supply of new gas takes place via the seals between the motor and compressor, either as diffusion across the seals or as a result of pressure transients across the seals between the first and the second compartments in the compressor module. A closed cooling circuit also has the advantage that cooling of the motor is not affected by the temperature of the medium that is compressed in the compressor and a possible increase in the temperature at the compressor inlet as a result of recirculation via the compressor.

Furthermore, a closed cooling circuit results in higher motor efficiency than if the motor were cooled by allowing relatively compressed gas to flow from the first stage or intermediate stage of the compressor back to the suction side for recompression.

For the sake of comprehensiveness, it should be mentioned that what in this description is termed the second compartment with motor, may also contain other sections or compartments, for example, a separate shaft coupling compartment located between the sealing system and the motor compartment proper. Similarly, the first compartment with compressor may also contain other sections, for example, it may be divided into a bearing compartment at the compressor shaft end furthest from the motor. However, this is, in principle, of no importance for the understanding of the present invention. What is essential is that somewhere between the motor and the compressor there is located at least one seal that protects the motor.

The compressed gas from the compressor is withdrawn at a suitable point on the pressure side of the compressor with regard to entrainment of contaminants and particles. The gas that is injected into the seal or in between the seals flows during normal operation without pressure transients in order to flow back to the suction side of the compressor, as the electric motor has a closed volume with the exception of the opening above the seals towards the compressor. Thus, the flow of contaminated gas from the compressor inlet directly from the first compartment into the second compartment is prevented. During pressure transients, on an increase in the compressor suction pressure there occurs a flow of sealing gas via the seals into the second compartment with motor until equilibrium has been achieved, and on a reduction in pressure there occurs a flow of sealing gas from the first compartment into the second compartment until equilibrium has been achieved.

Figure 2:
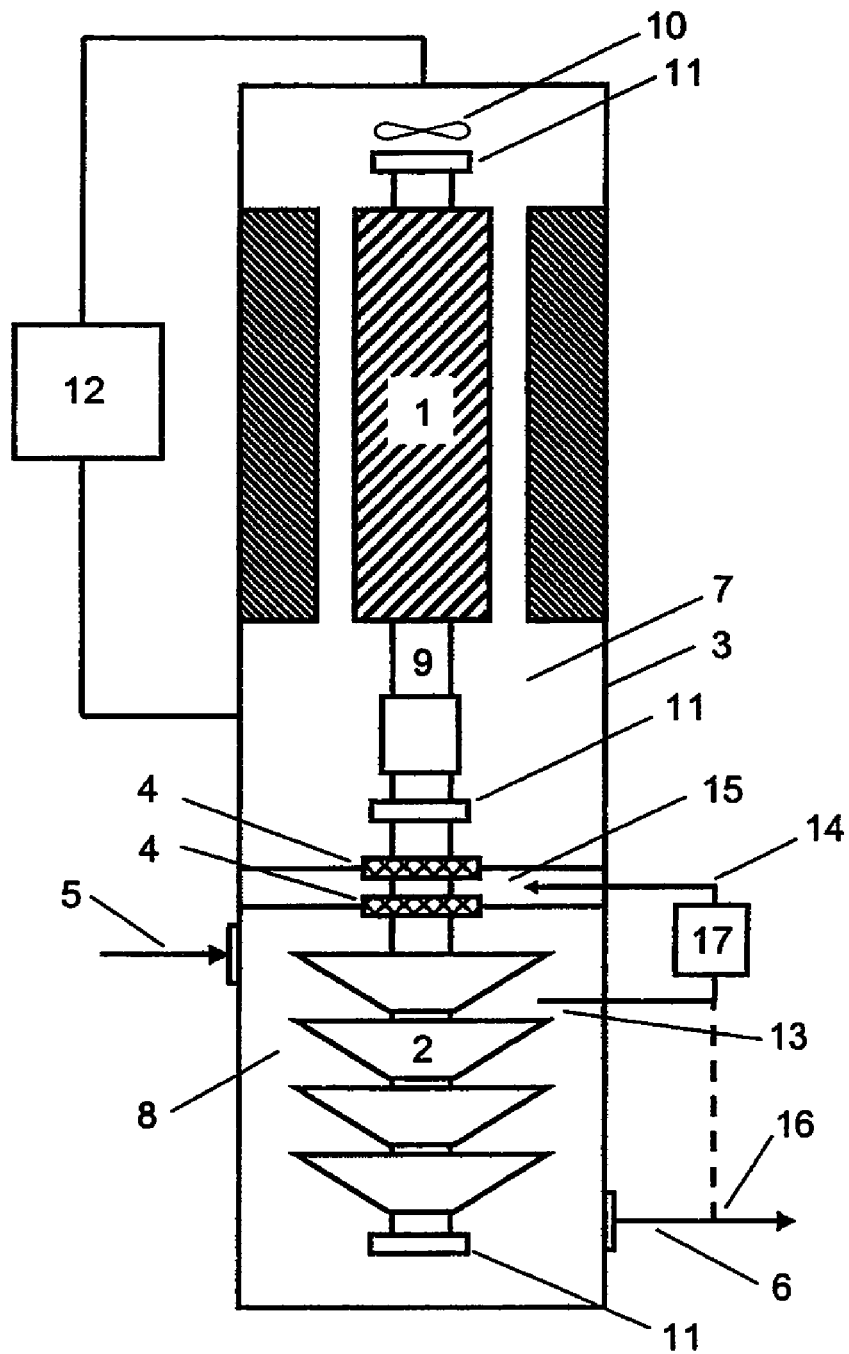

Preferred embodiments of the present invention are described below with reference to the attached drawings, wherein:

FIG. 1 shows a schematic diagram of the apparatus according to the invention; and FIG. 2 is a schematic view of a second embodiment of the invention.

A compressor module, see FIG. 1, comprises an electric gas-filled motor 1 and a compressor 2 interconnected via at least one shaft 9 and arranged in a common pressure shell 3. It is of no importance for the understanding of the present invention whether the motor and the compressor are mounted on a common rigid shaft or have separate shafts connected by a rigid coupling or whether there is a flexible coupling between the motor shaft and the compressor shaft. Furthermore, axial seals 4 are arranged between the compressor 2 and the motor 1, thereby dividing the pressure shell into a first compartment 8 with compressor 2 and a second compartment 7 with motor 1. It is understood that the number of axial seals is not necessarily as illustrated in the drawings, but may vary from just one to more than the two that are shown. The shaft 9 is supported on magnetic bearings 11, as for instance illustrated in FIG. 1, but the number and location of the magnetic bearings is of course not limited to the illustrated variant. The shaft 9 is preferably supported by means of magnetic bearings 11. The number and location of the magnetic bearings may differ from what is illustrated in the drawings. Although the use of magnetic bearings is preferred for the shaft support, the present invention is of course usable with other bearing types. The compressor module has an inlet pipe 5 and an outlet pipe 6 to and from the compressor compartment.

A withdrawal point 13 for sealing gas to the at least one axial seal 4 is shown downstream of a first stage or an intermediate stage of the compressor, or alternatively as a withdrawal point from the outlet 16 of the compressor. An external pipeline 14 or an internal bore conveys the sealing gas from the withdrawal point 13 or from the outlet 16 in between two or more axial seals 4. It is understood, however, that the sealing gas can be introduced directly into an axial seal, not shown in the drawings, so that in this way, for example, only one axial seal is required.

In the drawings the compressor module is shown vertically oriented, but it may also have a horizontal orientation.

A fan or a small compressor 10 is coupled to the motor shaft for forced circulation in the motor compartment 7. A motor cooler 12 is located outside the pressure shell 3. Thus, the gas-filled motor 1 is cooled by use of a closed cooling circuit. The fan or the small compressor 10 thus provides forced circulation of the gas in the motor compartment 7. The gas is circulated through the second compartment 7 with motor 1, past the magnetic bearings 11 to remove emitted heat and then out to the motor cooler 12 where the heat is emitted into the surrounding seawater. There is no supply of gas to the second compartment 7, with the exception of possible diffusion across the axial seals 4 or pressure equalisation across the axial seals 4 as a consequence of an increase in pressure at the compressor inlet 5. This means that during normal operation there is no supply of hydrocarbon gas from the compressor inlet 5 or the first compartment 8 with compressor 2 into the second compartment 7 with motor 1. The electric gas-filled motor 1 is therefore protected against condensate, water, particles or other contaminants which may be brought in together with the hydrocarbon gas via the compressor inlet.

In accordance with the present method, sealing gas is thus introduced between the second compartment 7 with motor 1 and the first compartment 8 with compressor 2, i.e., in between the axial seals 4 or alternatively directly into the axial seal, from the sealing gas withdrawal point 13 downstream of the first or intermediate stage of the compressor via the pipeline 14 or the bore. The withdrawal point may be located downstream of an optional impeller on the compressor 2, but a greater pressure than that obtained across the first impeller is not required. Furthermore, the withdrawal point should be positioned such that a minimum amount of contaminants are carried along with the sealing gas. An alternative point for withdrawal of the sealing gas is at the compressor outlet 16 or downstream of the compressor where the gas pressure is sufficiently high. During normal operation, the sealing gas thus flows through the axial seals 4 and into the first compartment 8 with compressor 2. Upon an increase in pressure at the compressor inlet 5, sealing gas flows into the second compartment 7 with motor 1 until pressure equilibrium has been achieved.

FIG. 2 shows a gas treatment unit that is included in the sealing gas supply line 14. The gas treatment unit can be constituted of a filter or the like to remove condensate, water, particles or other contaminants. The sealing gas still is injected into the seal 4 or in between the seals which separate the first compartment 8 with compressor 2 and the second compartment 7 with the gas-filled electric motor 1. The gas treatment unit can thus provide more optimal protection of the second compartment.

| | |
|---|---|
| 1 | Electric motor |
| 2 | Compressor |
| 3 | Pressure housing |
| 4 | Axial seals |
| 5 | Compressor inlet |
| 6 | Compressor outlet |
| 7 | Second compartment with motor |
| 8 | First compartment with compressor |
| 9 | Shaft |
| 10 | Fan or small compressor |
| 11 | Magnetic bearing |
| 12 | Motor cooler |
| 13 | Withdrawal point for sealing gas from downstream of the compressor's intermediate stage |
| 14 | An external pipeline or an internal bore for sealing gas |
| 15 | Sealing gas injection point in axial seals |
| 16 | Alternative supply of sealing gas from the compressor outlet |
| 17 | Gas treatment unit |

The invention claimed is:

1. A method for protection of compressor modules against undesirable influx of contaminated gas, comprising a pressure housing (3) which by means of one of more sealing elements (4) is generally divided into a first compartment (8) equipped with a compressor (2) and a second compartment (7) equipped with a gas-filled motor (1), the compressor and the motor being drivably connected to each other by at least one shaft (9), characterised in protecting the second compartment (7) with motor (1) against direct influx of contaminated gas from the first compartment (8) with compressor (2) by means of compressed gas that is supplied from a withdrawal point (13) at the first or intermediate stage of the compressor, or from the compressor outlet (16), and introducing the compressed gas directly into the seal (4) or in between two or more seals so as to flow through the at least one seal (4) back to the first compartment (8) with compressor (2).

2. A method according to claim 1, characterised in introducing the compressed gas from the compressor (2) into the seal (4) or in between two or more seals via an external pipeline (14) or an internal bore.

3. A method according to claim 2, characterised in installing the compressor module under or above water, on platforms or onshore.

4. A method according to claim 2, characterised in introducing the compressed gas from the compressor (2) into the seal (4) or in between two or more seals via a gas treatment unit (17) connected to the external pipeline (14) or the internal bore.

5. A method according to claim 2, characterised in cooling the second compartment (7) with motor (1) by use of a closed cooling circuit equipped with an external motor cooler (12).

6. A method according to claim 2, characterised in supporting the at least one shaft (9) by magnetic bearings (11).

7. A method according to claim 1, characterised in installing the compressor module under or above water, on platforms or onshore.

8. A method according to claim 7, characterised in introducing the compressed gas from the compressor (2) into the seal (4) or in between two or more seals via a gas treatment unit (17) connected to the external pipeline (14) or the internal bore.

9. A method according to claim 7, characterised in cooling the second compartment (7) with motor (1) by use of a closed cooling circuit equipped with an external motor cooler (12).

10. A method according to claim 7, characterised in supporting the at least one shaft (9) by magnetic bearings (11).

11. A method according to claim 1, characterised in introducing the compressed gas from the compressor (2) into the seal (4) or in between two or more seals via a gas treatment unit (17) connected to the external pipeline (14) or the internal bore.

12. A method according to claim 11, characterised in cooling the second compartment (7) with motor (1) by use of a closed cooling circuit equipped with an external motor cooler (12).

13. A method according to claim 1, characterised in cooling the second compartment (7) with motor (1) by use of a closed cooling circuit equipped with an external motor cooler (12).

14. A method according to claim 1, characterised in supporting the at least one shaft (9) by magnetic bearings (11).

15. An apparatus for protection of compressor modules against undesirable influx of contaminated gas, comprising a pressure housing (3) which by means of one of more sealing elements (4) is generally divided into a first compartment (8) equipped with a compressor (2) and a second compartment (7) equipped with a gas-filled motor (1), the compressor and the motor being drivably connected to each other by at least one shaft (9), characterised in that the second compartment (7) with motor (1) is protected against direct influx of contaminated gas from the first compartment (8) with compressor (2) by means of compressed gas that is supplied from a withdrawal point (13) at the first or intermediate stage of the compressor, or from the compressor outlet (16), and that the compressed gas is introduced directly into the seal (4) or in between two or more seals so as to flow through the at least one seal (4) back to the first compartment (8) with compressor (2).

16. An apparatus according to claim 15, characterised in that the compressed gas from the compressor (2) is introduced into the seal (4) or in between two or more seals via an external pipeline (14) or an internal bore.

17. An apparatus according to claim 15, characterised in that the compressor module is installed under or above water, on platforms or onshore.

18. An apparatus according to claim 15, characterised in that the compressed gas from the compressor (2) is introduced into the seal (4) or in between two or more seals via a gas treatment unit (17) connected to the external pipeline (14) or the internal bore.

19. An apparatus according to claim 15, characterised in that the second compartment (7) with motor (1) is cooled by use of a closed cooling circuit equipped with an external motor cooler (12).

20. An apparatus according to claim 15, characterised in that the at least one shaft (9) is supported by magnetic bearings (11).

* * * * *